United States Patent [19]

Borgstrom

[11] 4,083,489
[45] Apr. 11, 1978

[54] RECORDING DISTANCE MEASURING INSTRUMENT AT VEHICLE WHEEL HUB

[75] Inventor: Lennart Borgstrom, Svangsta, Sweden

[73] Assignee: Record Taxameter AB, Halmstad, Sweden

[21] Appl. No.: 612,208

[22] Filed: Sep. 10, 1975

[30] Foreign Application Priority Data

Feb. 24, 1975 Sweden .............................. 7502009

[51] Int. Cl.² ........................................... G01C 22/00
[52] U.S. Cl. .................................................. 235/95 C
[58] Field of Search .................. 235/95 R, 95 B, 95 C

[56] References Cited
U.S. PATENT DOCUMENTS

| | | | |
|---|---|---|---|
| 1,684,928 | 9/1928 | Simpson | 235/95 R X |
| 1,756,443 | 4/1930 | Veeder | 235/95 B |
| 3,130,907 | 4/1964 | Coffey | 235/95 C |
| 3,198,430 | 8/1965 | Hermann | 235/95 C |
| 3,356,298 | 12/1967 | Crilly | 235/95 C |
| 3,735,103 | 5/1973 | Finley | 235/95 B X |
| 3,779,456 | 12/1973 | Burnett | 235/95 B |

Primary Examiner—Stanley J. Witkowski
Attorney, Agent, or Firm—Sherman & Shalloway

[57] ABSTRACT

A distance measuring device for attachment to the hub of a vehicle wheel includes a pendulum, which remains generally stationary, as the hub rotates. A counting mechanism rotates with the hub, and is coupled through a worm wheel and lost-motion mechanism to the pendulum. The lost-motion mechanism reciprocates a feeding arm against the bias of a spring, which shifts periodically back and forth over center, as the lost-motion mechanism periodically transmits motion. A feed spring, mounted on the feeding arm, acts as a pawl to intermittently advance a ratchet wheel, coaxially disposed on the counting mechanism, to thereby index the counting mechanism as the vehicle wheel turns. If the counting mechanism, by any means, becomes jammed then the feed spring will deform, preventing further operation of the counting mechanism.

10 Claims, 8 Drawing Figures

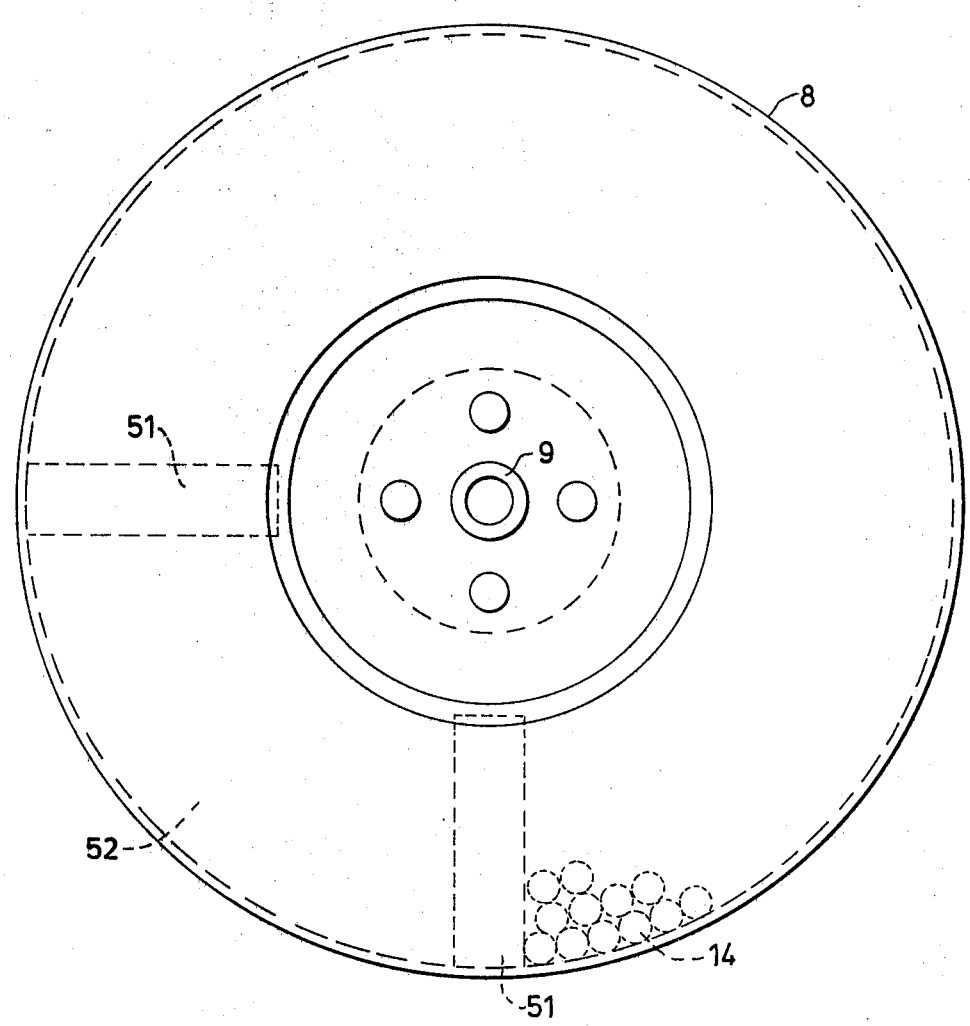

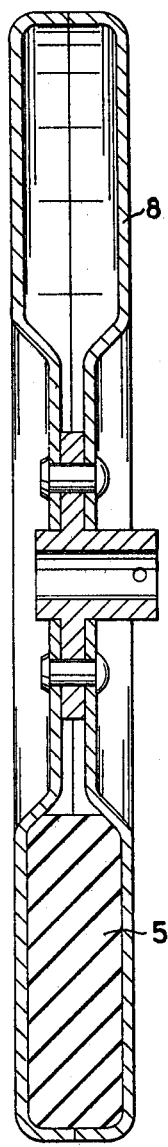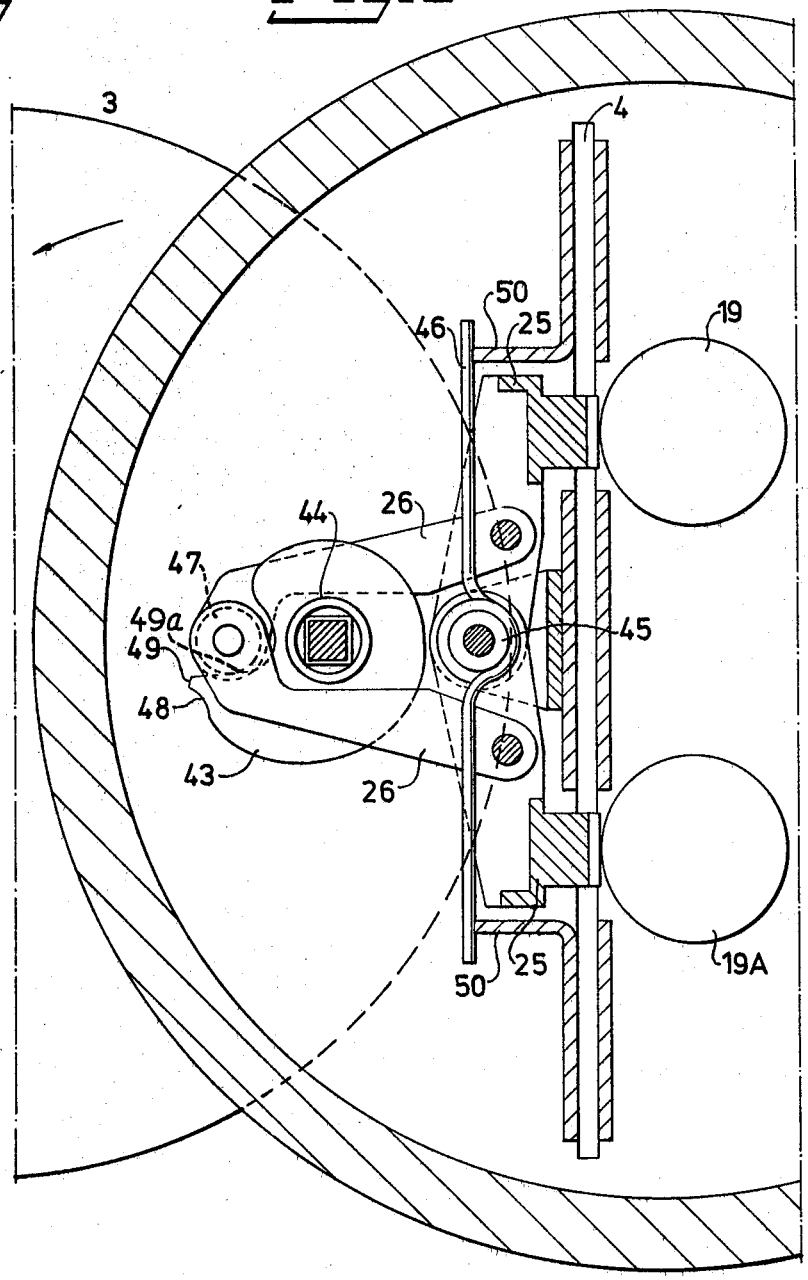

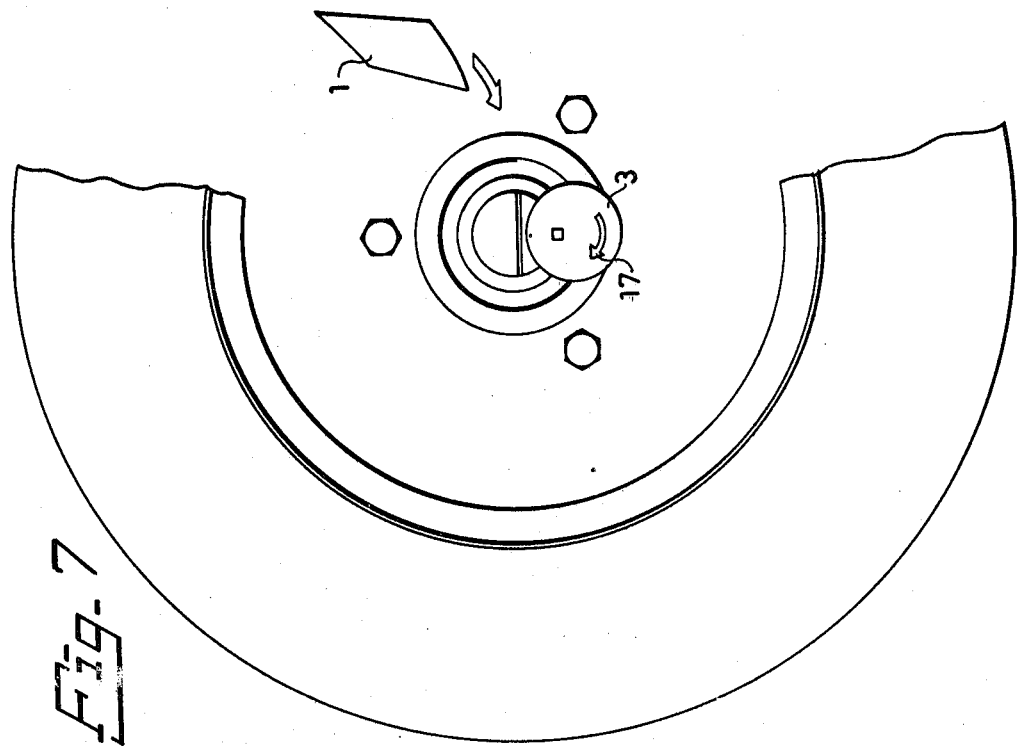
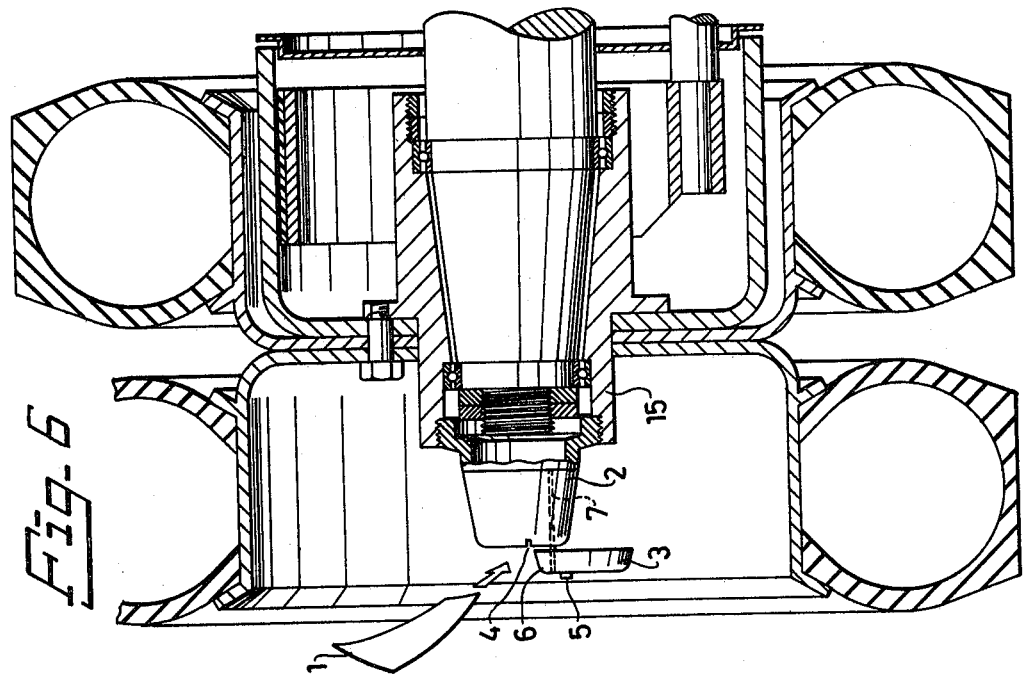

RECORDING DISTANCE MEASURING INSTRUMENT AT VEHICLE WHEEL HUB

BACKGROUND OF THE INVENTION

1. Field of the Invention

This invention relates to a device attached to a vehicle wheel hub for recording the distance covered by the vehicle and comprising a counting mechanism, a printing mechanism for stamp cards and feed means for feeding the counting mechanism wheels as a function of said distance. Such a device is disclosed in copending U.S. patent application Ser. No. 549,702, filed Feb. 13, 1975, incorporated herein by reference and now abandoned.

2. Technical Considerations and Prior Art

The distance measuring instrument in question can be coupled and attached to wheel hubs of both traction vehicles and trailers coupled to such vehicles. In view of the fact that the distance measuring instrument is intended to be attached to a wheel hub, it may be called "hub meter". Its counting mechanism may be of any conventional design comprising number wheels provided with types or printing dyes. The hub meter further comprises a mechanism with stationary number types corresponding to the apparatus number of the meter. The stamping mechanism may be of known design and is intended to release the printing of the values of the number types in question on the number wheels in the counting mechanism, i.e., the distance in kilometers covered by the vehicle, onto a stamp card, which for this purpose is introduced into the hub meter. At the same time, said apparatus number is printed. The stamp card, which is provided with carbon paper, is introduced for printing through a card slot in the meter, which slot becomes accessible when a covering or protective lid on the free end of the meter is pivoted or folded aside. Said lid, in addition to sealing the meter to prevent dirt from entering thereinto, also acts as a handle for releasing the printing mechanism. When the lid is to be folded aside, a screw in the lid is actuated to release the lid from the apparatus casing, whereafter the lid is actuated for exposing the slot to introduce the stamp card therethrough. The lid is then, for printing, actuated in a definite way in order to release the printing mechanism to print on the stamp card introduced into the card slot. The movement of the lid in this conjunction may be a rotary or a folding movement.

The hub meter, further, may comprise a curtain or slide, which normally shuts the card slot, but is opened when the meter is being operated for card printing, and thereafter is shut to prevent improper objects, which may block the counting mechanism, from being introduced into the meter through the card slot. Such curtains have been proposed previously for meters of other types.

The hub meter may in addition include a base plate, which is intended for mounting and supporting the meter and faces towards the wheel hub, to which it is attached. Said base plate is heat-insulated from the remaining details of the meter, so that heat produced by the vehicle wheel cannot be transferred by conduction to the interior of the meter.

The number wheels of the counting mechanism may be arranged to be advanced by jumps, irrespective of the rotational direction of the vehicle wheel.

It is understood that a hub meter rotates together with the vehicle wheel to which the meter is attached when the vehicle is driven. The counting mechanism rigidly mounted in the meter housing then also rotates together with said wheel. For rendering it possible for the counting mechanism wheels to be advanced in synchronism with the movement of the vehicle wheel and meter, a feed mechanism actuated by the rotation of the meter must be introduced. For this purpose, a non-rotary reference means must be introduced into the meter as a fixed "reference point". According to the invention, a pendulum mechanism is utilized which, by action of gravitation, maintains a substantially constant position, independently of the rotation of the meter and counting mechanism, and which actuates the feed mechanism for the number wheels of the counting mechanism. Said pendulum mechanism comprises a pendulum with a swing axle, which is concentric with the vehicle axle, and includes means for coupling said axle to the feed mechanism.

Under such operational conditions as acceleration and retardation of a vehicle, when the vehicle drives down into holes in the road, etc., a pendulum tends to turn round one or more revolutions, and at its worst has the tendency of participating in the rotary movement of the hub meter, which is attached to and caused to rotate by said wheel, so that the feed mechanism of the counting mechanism remains unaffected and, consequently, recording of the covered distance does not take place. The pendulum according to the invention is so designed that such inconveniences due to incorrect recording of covered distances are avoided. The pendulum, more precisely, has been given the shape of a thin-walled, hollow ring with smooth inner surface. The annular space in the ring is filled to some part with movable spherical balls of a heavy material, for example lead. The balls can move freely relative to each other and to the inner walls of the ring. The resulting friction effect implies an effect consumption, which efficiently brakes the ring under such conditions, which otherwise would have caused a pendulum with lumped mass to participate in the rotation of the meter. The pendulum, furthermore, is provided with a fixed balance weight, in order to prevent the annular pendulum from slowly migrating around when it is subjected to vibration forces. Owing to the gravity force, the unbalance thus obtained in the pendulum system with ring and balls will cause the pendulum to assume a substantially constant static position.

SUMMARY OF THE INVENTION

The present invention relates to such a device according to the afore-cited patent application wherein there is a feed mechanism for the number type wheels of the counting mechanism, a modified pendulum means and a printing mechanism. The object of the invention is to improve the operational reliability of such a device and, respectively, to render unauthorized actuation thereof impossible and, respectively, easily revealable.

BRIEF DESCRIPTION OF THE DRAWING

These features, and other features of a subsidiary nature, are described in greater detail by way of an embodiment shown in the accompanying drawings, in which:

FIG. 1 is a top planar view of a pendulum used in the device of the instant invention;

FIG. 2 is a section through FIG. 1, along lines 2—2 thereof;

FIG. 3 is a sectional view, which shows the printing mechanism;

FIG. 6 is a view, partially in section, of a vehicle wheel provided with the distance measuring instrument according to the invention;

FIG. 7 is a partial sectional view which shows a portion of said wheel seen from the side.

DETAILED DESCRIPTION

Figure 4:
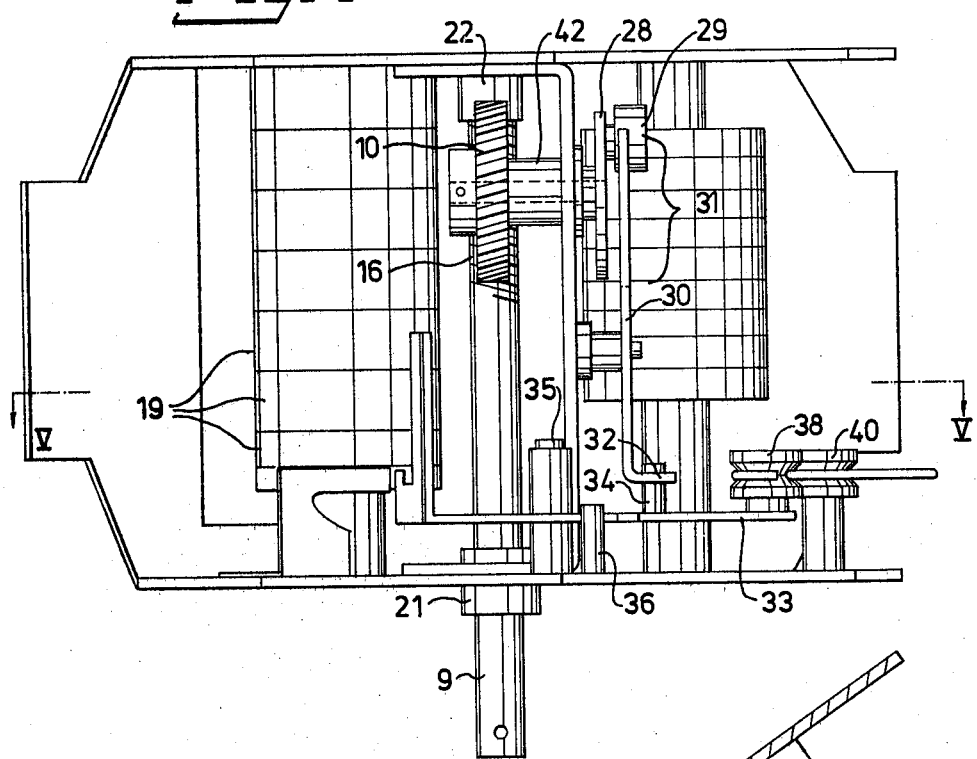
FIG. 4 is a top view showing the feeding mechanism proper for the number type wheels.
Figure 8:
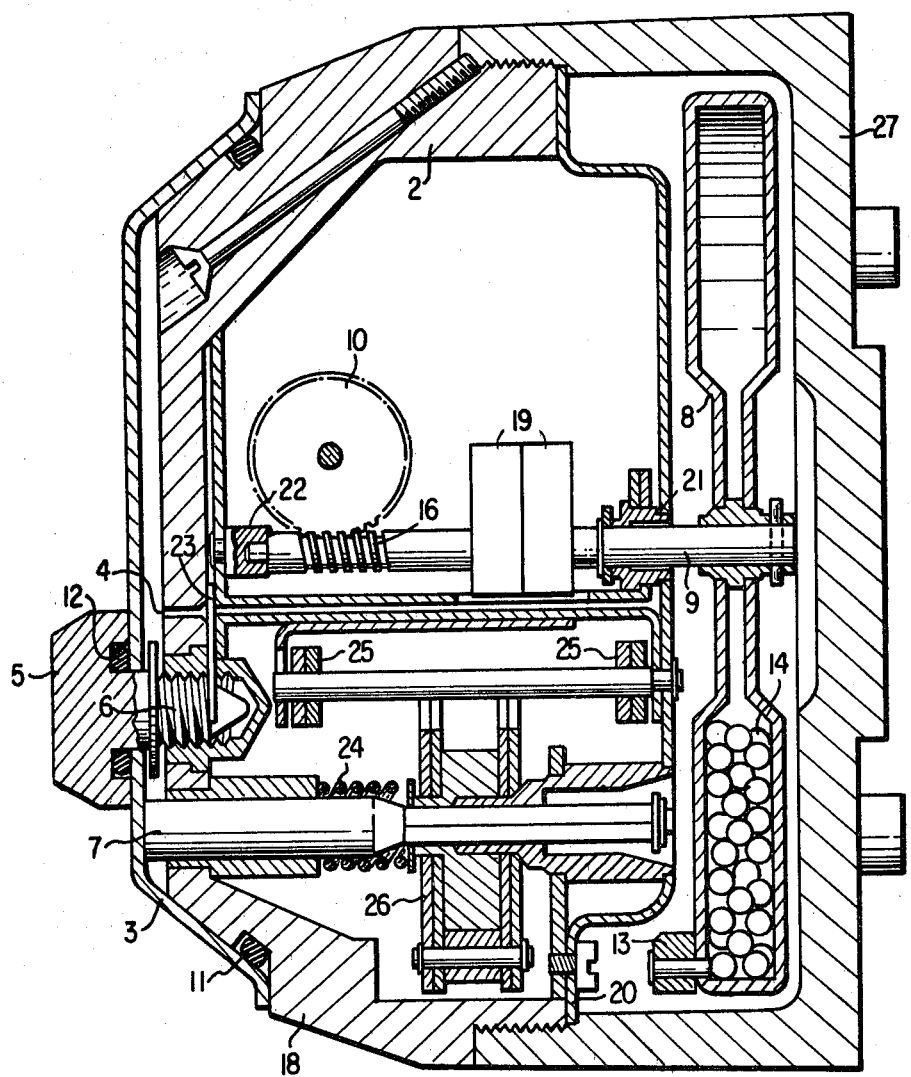
FIG. 8 is a cross-section through the distance measuring instrument according to the invention, of which the main parts are visible.

The pendulum applied in the present invention, and shown in FIGS. 1 and 2, differs slightly from the pendelum according to the aforementioned, incorporated U.S. Patent Application, now abandoned and illustrated by FIG. 8. The pendulum 8, as shown in FIG. 1, does not include the stationary balance weight disclosed in the main patent U.S. Patent Application Ser. No. 549,702, filed Feb. 13, 1975, now abandoned and illustrated in FIG. 8, but instead includes a pendulum of annular body shape having a space 52. The space 52 is closed by means of two rubber strips 51, and thereby remains free of balls 14. The balls 14 can move within the remaining part of the interior of the pendulum 8 and preferably are of a stainless and unmagnetic material. This arrangement acts as a stationary unbalanced weight, and the pendulum, as in the aforecited patent, is prevented from migrating about during rotation of the vehicle wheel. In FIG. 1, the pendulum axle is designated by 9 and supported in bearings 21, 22 (FIG. 4).

In FIGS. 6 and 7, a so-called hub meter 2 is shown mounted on a vehicle hub 15 to rotate together with the vehicle wheel. The hub meter, as will be apparent in greater detail from the following, comprises a kilometer counting mechanism, which is mounted in the meter housing so that it rotates together with the meter. Within the meter housing, a card printing mechanism is mounted to print on a stamp card 1 the kilometer value in question indicated in the counting mechanism. The meter is provided with a protective lid 3, which is pivotal about an axle 7 and normally covers the free end of the meter, but after loosening a lid screw 5 from its thread 6 in the hub meter, the housing can be swung down to the position shown in FIGS. 6 and 7, in which position a card insertion slot 4 is exposed for inserting the stamp card 1. In order to release the printing mechanism, the lid 3 is rotated, as indicated by the arrow 17 in FIG. 2.

The meter housing, as appears from FIG. 3, comprises a meter hood 18 and a meter base plate 27. Between a cup-shaped bottom 20 and the base plate 27, a pendulum 8 is located, and between the bottom 20 and hood 18, the counting mechanism and printing mechanism are arranged.

The counting mechanism is illustrated by one counting mechanism wheel 19, and the printing mechanism by a hammer 25, lifting arm 26 and the lid axle 7 which releases the printing mechanism.

The protective lid 3 is held in a position above the free (left-hand) end of the lid screw 5, which is screwed into a thread 6 in the meter hood 18. The screw 5 is provided with a sealing gasket 12, and the lid 3 has a sealing ring 11. As mentioned above, the lid 3 can be swung about its axle 7 when the screw 5 has been loosened. Consequently, the card slot 4 is exposed when the curtain plate 23 is moved aside.

The annular pendulum 8 is a hollow ring, which is partially filled with metal balls 14 and provided with a stationary weight 13. The pendulum is attached to the projecting free (right-hand) end of a swing axle 9, which is freely supported for rotation in a bearing 21 in the bottom 20 and a bearing 22 at its other (left-hand) end. The left-hand end of the axle 9 is provided with a screw 16 for engagement with a worm gear wheel 10. Said worm gear wheel 10 co-acts with a feed mechanism for the number type wheels of the counting mechanism. As appears from the construction shown and from the information in the above introductory portion, the pendulum 9 maintains substantially its position shown in FIG. 8, with the weight 13 farthest down during the rotary movement of the vehicle wheel and the meter in general. The relative motion between the counting mechanism and swing axle serves, by help of the worm gear 10, 16, to advance the type wheels of the counting mechanism to an extent proportional to the distance covered by the vehicle wheel. so that the number wheels of the counting mechanirm at any moment indicate the corresponding number of kilometers which by printing in the manner described can be transferred to a stamp card introduced into the meter.

FIG. 3, which is best understood in conjunction with FIG. 8, shows a printing mechanism according to the invention. With this mechanism, printing is effected on a card introduced through the card slot 4 by means of a mechanism comprising a stationary number printing wheel 19A set for the apparatus number of the vehicle, and a number wheel 19 recording the distance covered. The mechanism is shown in FIG. 3 after printing has been performed, with the card removed and the lid 3 swung outwards. In order to reset the mechanism, the lid is swung in counter-clockwise direction through about 90°. The two hammers 25 are then by means of the lifting arms 26 lifted by a cam disc 43, which is mounted in a sleeve 44 being fastened in the bottom 20 (FIG. 3 in the co-pending U.S. Patent Application Ser. No. 549,702, filed February 13, 1975 and incorporated herein by reference). The hammers 25 are swung somewhat upwards about their axle 45 and clamped by a spring 46.

For effecting the printing, lid 3 is turned in a clockwise direction so that the spring 46 is tensioned additionally and a follower or roll 47 rolls down into a notch 48 in the cam disc 43, which notch is so located that the card slot 4 is exposed and the hammers 25 are lifted so as to permit insertion of the card. When turning the lid 3, a strongly increasing resistance against further continued turning is felt in the lid due to engagement between the follower 47 and said notch 48 and, therefore, the printing position cannot be passed unconsciously. This alerts the operator that a printing stroke is imminent. Upon swinging the lid 3 then through a few degrees, the roll 47 passes the highest point 49 of the cam disc and the roll drops down a steeply declining portion 49a allowing the hammers 25 to move rapidly, and the hammers effect a print of the number wheels 19 and 19A on the stamp card. The legs of the springs 46 are stopped by stop members 50, and the hammers 25 complete the last part of their movement without any spring pressure. The card subsequent to being printed therefore, is not subjected to pressure action and can easily be removed from the card slot 4.

Figure 5:
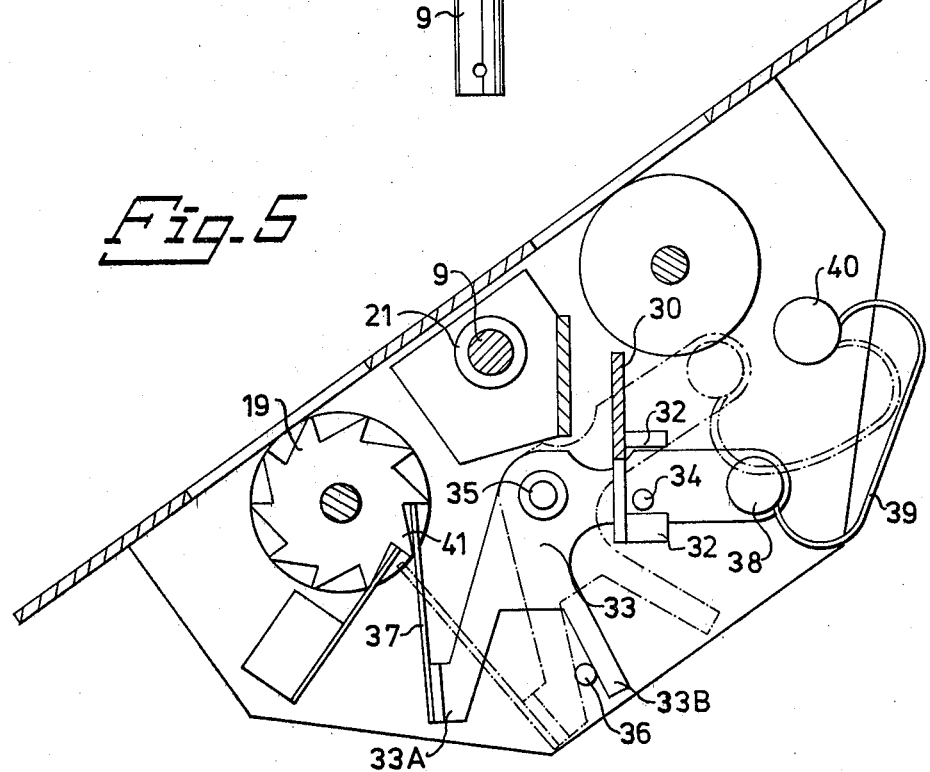
FIG. 5 is a section taken along line 5—5 of FIG. 4.

The feed mechanism for the number type wheels of the counting mechanism which was not shown in greater detail in the afore-mentioned, incorporated patent application, is shown in FIGS. 4 and 5. The first part of the transfer system for transferring the continuous movement of the worm wheel 10 (from the axle 9 via the screw 16) to the number wheels 19 consists of a crank mechanism. The axle 42 carrying the worm wheel 10 is provided at its opposite end with a plate 28 and a crank pin 29, which actuates a supported crank arm 30 via a groove 31 therein. The crank arm will reciprocatingly rock between its end positions, independently of the rotation direction of the worm wheel 10. The crank arm is provided at its end opposite to its groove 31 with outward bent dog tips 32, which actuate a feed arm 33 through a stop 34 riveted thereon. Because of the space between the tips 32 there is a lost motion mechanism resulting from the movement of stop 34. The feed arm 33 is supported on an axle 35 and can swing between two end positions, which are determined by the contour of the feed arm 33 and by a stop pin 36. On said feed arm further attached a feed pawl spring 37 and a spring support 38. The feed pawl spring 37 actuates a ratchet wheel mounted on the first number wheel 19. The feed arm 33 is also actutated via the spring support 38 by a snap spring 39, which at its other end is suspended in a support 40 so as to establish an over-center relationship between the solid and dotted line positions shown in FIG. 5. The feed arm can assume two stable positions as the snap spring 39 goes over center, viz. a first position, indicated by dash-dotted line, with a contour arm 33A against the stop pin 36, in which position the snap spring 39 is tensioned and the feed spring 37 is ready to advance a tooth 41 of the ratchet wheel on the first number wheel 19, and a second position, with a contour arm 33B resting against the stop pin 36. In this second position, the snap spring 39 is relieved and the tooth 41 has been advanced one position. By designating a suitable clearance between the dog tips 32 and the stop member 34 (FIG. 5), a forced feed of the feed arm between the two end positions as determined by the stop pin 36 and the contour arms 33A and 33B is effected. This forced feed is not utilized in normal operation, because the snap spring 39 causes the feed arm 33 to be slowly lifted up to the dead position whereafter it snaps over center to the stable end positions. If for some reason the snap movement is obstructed, for example due to penetrated dust or dirt, increased friction or means inserted unauthorizedly into the mechanism for braking the wheels, the number wheels still will be forcedly advanced and, thus, the counting of the distance covered will continue. If the number wheels are braked to a definite stop, or jammed the feed spring 37 will be overloaded and deformed permanently so that no further advancement of the number wheels will take place, not even after the stop jam has been removed.

I claim:

1. In a device attached to a hub of a vehicle wheel axle for recording the distance covered by the vehicle, wherein the device includes a counting mechanism utilizing wheels, a printing mechanism for stamping cards, and feed means for advancing the counting mechanism wheels as a function of said distance, drive means for said feed means in the form of a pendulum of annular shape mounted on an axle concentric with the vehicle wheel axle, mechanical coupling means in the form of a worm wheel, and a screw on the pendulum axle to the feed means for the counting mechanism wheels, the improvement comprising:

a feed arm included with said feed means for engaging and indexing the counting mechanism wheels, as the feed arm moves between first and second end positions;

a snap spring for moving said feed arm between said first and said second positions;

means mounting said snap spring in overcenter relationship, with respect to said feed arm, to thereby retain said feed arm in said first and said second positions;

rotating means driven by said worm wheel, which rotates relative to the feed arm, as the vehicle moves, and a lost-motion mechanism, disposed between said rotating means and said feed arm for intermittently transmitting motion to said feed arm, to thereby move said feed arm intermittently between said first and second positions, in order to index said counting mechanism wheels.

2. A device, according to claim 1, characterized in that the feed arm includes a feed pawl spring, the free end of which engages a ratchet wheel to index said counting mechanism wheels.

3. A device, according to claim 2, characterized in that the wheel actuates the feed arm via a crank mechanism comprising a crank arm mounted to reciprocate between two end positions independently of the direction of rotation of the worm wheel, and wherein said crank arm is provided at its free end with two spaced dog tips that cooperate with a stop member, fastened between them on the feed arm.

4. A device, according to claim 3, characterized by a space between said tips and the stop member for effecting a forced feed of the feed arm between its end positions over the effect of a snap spring.

5. A device, according to claim 1, wherein said feed pawl spring is permanently deformed, when the counting mechanism wheels are jammed, so that no further advancement of said wheels can take place, even when the cause of jamming is removed.

6. A device, according to claim 1, wherein the pendulum has a shape of a hollow annular body partly filled with movable metal balls, and wherein a portion of the hollow interior of the annular body is blocked by partition walls to obstruct the entrance of metal balls into said portion.

7. A device, according to claim 1, comprising a lid, which is utilized as a control means for the operation of the printing mechanism, wherein the printing mechanism includes a cam disc rotated by turning said lid, a follower guided on the periphery of said cam disc, two arms supported rotatably at one end at the follower, and having hammers at the other end for effecting the printing, so that the position of the hammers is dependent on the position of the roll on the periphery of the cam disc, which periphery comprises a successively rising portion to pull the hammers back against the action of a spring, and a steeply declining portion for rapidly moving the hammers ahead to strike against stamping cards inserted between the hammers, and counting mechanism wheels, when the spring is being released.

8. A device, according to claim 7, wherein stop means is used to prevent spring pressure against the hammers during the last part of their striking movement.

9. A device, according to claim 7, characterized in that the disc includes a notch to inform the apparatus operator that a printing stroke is imminent, after a further turning of the lid through a small increment.

10. A device according to claim 1 characterized in that the first and second positions of the snap spring are such that only that portion of the movement of the feed arm which is effected by means of the snap spring is utilized for advancing the counting mechanism wheels.

* * * * *